(12) United States Patent
Miller et al.

(10) Patent No.: US 7,627,403 B2
(45) Date of Patent: Dec. 1, 2009

(54) BIAS CORRECTING PHASE COMPENSATING RATE LIMITER

(75) Inventors: David G. Miller, Mt. Laurel, NJ (US); Yi Lu, Media, PA (US)

(73) Assignee: The Boeing Company, Irvine, CA (US)

( * ) Notice: Subject to any disclaimer, the term of this patent is extended or adjusted under 35 U.S.C. 154(b) by 660 days.

(21) Appl. No.: 11/277,262

(22) Filed: Mar. 23, 2006

(65) Prior Publication Data

US 2007/0252046 A1   Nov. 1, 2007

(51) Int. Cl.
*G01C 23/00* (2006.01)

(52) U.S. Cl. ............................... 701/3; 701/29; 701/36; 701/66

(58) Field of Classification Search ...................... 701/3, 701/29, 33, 36, 66; 318/561, 566, 584; 244/221
See application file for complete search history.

(56) References Cited

U.S. PATENT DOCUMENTS

| | | | |
|---|---|---|---|
| 4,709,336 A | 11/1987 | Zweifel | |
| 4,866,361 A | 9/1989 | Donley et al. | |
| 5,224,664 A * | 7/1993 | Adams et al. | ............ 244/17.13 |
| 7,345,448 B2 * | 3/2008 | Watt et al. | .................... 318/632 |

FOREIGN PATENT DOCUMENTS

| EP | 1 429 220 A1 | 6/2004 |
|---|---|---|
| GB | 796056 | 6/1958 |
| WO | WO 99/09461 | 2/1999 |

OTHER PUBLICATIONS

European Patent Office Search Report dated Jun. 26, 2007.

* cited by examiner

*Primary Examiner*—Gertrude Arthur Jeanglaud
(74) *Attorney, Agent, or Firm*—Charles L. Moore; Moore & Van Allen, PLLC (57) ABSTRACT

A bias correcting phase compensating rate limiter to control movement of a device may include a switching arrangement adapted to reverse a polarity of an error signal in response to a set of predetermined conditions that may include a commanded rate of movement of the device exceeding a rate limit capability of the device; a time rate of change of an input signal to the rate limiter being opposite in polarity to a difference between the input signal to the rate limiter and an output signal from the rate limiter; and a time rate of change of the input signal to the rate limiter being opposite in polarity to a difference between the output signal from the rate limiter and a signal corresponding to a pre-specified neutral or trim position of the device.

31 Claims, 5 Drawing Sheets

BIAS CORRECTING PHASE COMPENSATING RATE LIMITER

BACKGROUND OF THE INVENTION

The present invention relates to control systems for aircraft, aerospace vehicle or the like and more particularly to a bias correcting phase compensating rate limiter and method.

Figure 1:
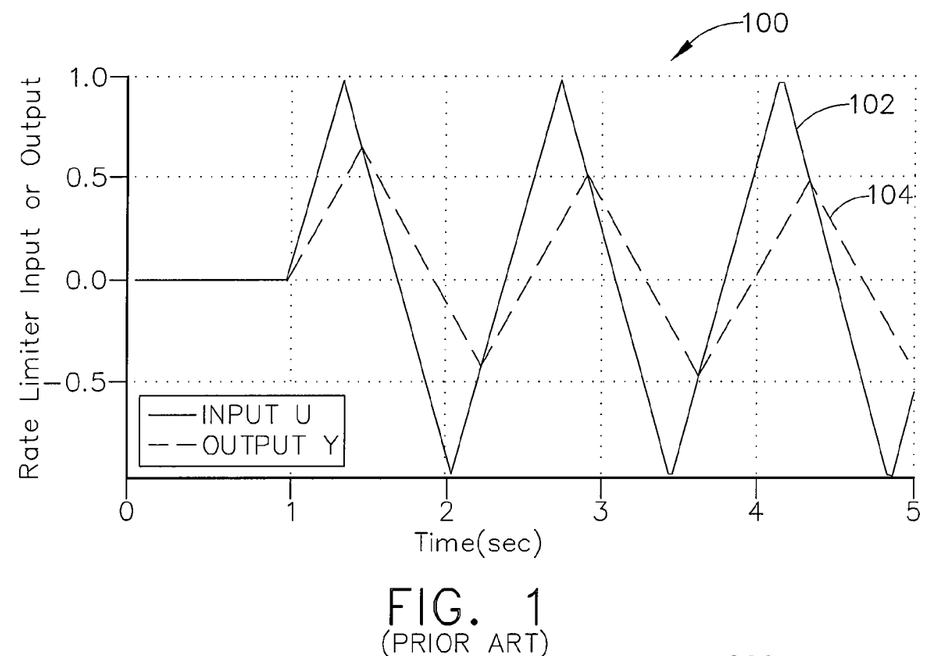
FIG. 1 is a graph of an input signal compared to an output signal of a prior art rate limiter that is not bias corrected and phase compensated.

Mechanical devices, such as actuators or the like, are typically used in fixed wing aircraft, helicopters, and tilt rotor aircraft to control movement of flight control members or surfaces, such as elevators, rudders, ailerons, engines, rotors, swashplates, blades and the like. These actuators are generally designed so that their maximum possible rate of displacement is low enough that actuator failures or inadvertent large and rapid pilot stick inputs cannot cause aircraft structural failure or loss of aircraft control. When it is impractical or inefficient to design actuators so that their maximum rate of motion is mechanically or hydraulically limited, the electronic circuitry or digital software that generates the driving input signals to the actuator is often designed so that the actuator is never commanded to move beyond a specified rate limit. In many instances, rapid maneuvering or quick operation of flight controls, such as rudder pedals, center stick, collective lever or other such controls can saturate or exceed the physical rate limit capabilities of these actuators or mechanisms or exceed the equivalent electronic rate limits implemented in the analog circuitry or software that commands the actuators. Actuator or software rate limit impingement can result in a phase lag causing operation of the actuator to lag behind movements of the controls by the pilot. This phase lag in actuator response significantly delays aircraft response to rapid pilot inputs, making it difficult for pilots to predict the effect of their stick inputs and control the aircraft with the precision necessary for aviation. FIG. 1 is a graph 100 of an input signal 102 compared to an output signal 104 of a prior art rate limiter that is not bias corrected or phase compensated. As illustrated, without phase compensation, the output signal 104 will lag behind the input signal 102.

Figure 2:
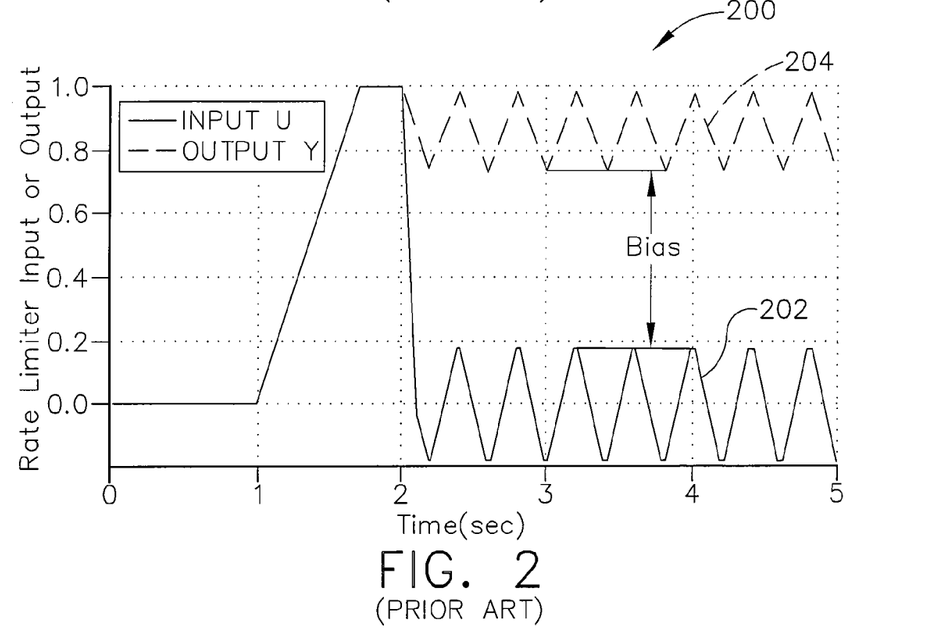
FIG. 2 is a graph of an input signal compared to an output signal of a prior art phase compensated rate limiter that is not bias corrected.

Prior art methods attempt to compensate for the phase lag in actuator response that occurs when actuator rate limits are saturated. However, the prior art methods for rate limiter phase compensation produce a significant undesirable side effect. When a rate limiter is adapted to compensate for phase lag using prior art methods, biases or sustained differences in the magnitude between an input signal to the rate limiter and the output signal controlling the mechanical device or actuator can result. FIG. 2 is a graph 200 of an input signal 202 compared to an output signal 204 of a prior art phase compensated rate limiter that is not bias corrected. As illustrated in FIG. 2, short term perturbations in the output signal 204 may be substantially in phase with short term perturbations in the input signal 202 but there is a distinct bias between the long term moving averages of the input signal 202 and the output signal 204. The long term biases introduced by prior art phase compensating rate limiters can result in aircraft control response predictability that is at least as poor as that experienced without phase compensation and in worst case scenarios could result in a complete loss of aircraft control if the bias grows too large.

BRIEF SUMMARY OF THE INVENTION

In accordance with an embodiment of the present invention, a Bias Correcting Phase Compensating Rate Limiter is provided. The Bias Correcting Phase Compensating Rate Limiter defines a means of limiting actuator rate without introducing significant phase loss or biases between the actuator command and the response of the actuator for a significant class of systems encountered in aircraft flight control as well as other applications. The Bias Correcting Phase Compensating Rate Limiter is applicable to a class of systems wherein one has knowledge of a "trim" or "neutral" position that provides satisfactory performance for the actuator or signal that is to be rate limited when it is commanded in an oscillatory manner beyond its rate limit capability. This class of systems is relatively common in aviation and other applications requiring high bandwidth control, wherein an actuator capable of high rate but limited authority motion is supplemented by one or more secondary actuators with more limited rate capabilities but more control authority. Aircraft equipped with mechanical flight control systems and limited authority and rate stability augmentation actuators often employ this class of systems to provide high bandwidth command following and stabilization, avoid actuator authority saturation throughout the flight envelope, and provide docile and easily controllable responses to actuator failures. The class of systems addressed by this invention also encompasses aircraft equipped with redundant independent control surfaces with differing levels of transient structural load sensitivity to high rate control surface commands. Control surfaces that generate high transient loads would be actuator rate limited in this case, allowing them to be used for trim functions and low bandwidth control power enhancement.

In accordance with another embodiment of the present invention, a bias correcting phase compensating rate limiter to control movement of a device may include a switching arrangement adapted to reverse a polarity of an error signal in response to a group or set of predetermined conditions that may include but is not necessarily limited to: a commanded rate of movement of the device exceeding a rate limit capability of the device; a time rate of change of an input signal to the rate limiter being opposite in polarity to a difference between the input signal to the rate limiter and an output signal from the rate limiter; and a time rate of change of the input signal to the rate limiter being opposite in polarity to a difference between the output signal from the rate limiter and a signal corresponding to a pre-specified neutral or trim position of the device.

In accordance with another embodiment of the present invention, a flight control system may include a member to control flight of an aircraft. The system may also include an actuator to control movement of the member and a bias correcting phase compensating rate limiter to control movement of the actuator.

In accordance with another embodiment of the present invention, a method to control movement of a device may include limiting a time rate of change of a device control signal. The method may also include substantially avoiding any phase loss in limiting the time rate of change of the device control signal. The method may further include substantially correcting for any bias in limiting the time rate of change of the device control signal without introducing phase loss between the input to and output from the device.

In accordance with another embodiment of the present invention, a method to control an aircraft may include controlling movement of an actuator. The method may also include limiting a time rate of change of an actuator control signal using a rate limiter. The method may also include substantially avoiding any phase loss in the rate limiter and substantially correcting for any bias between an input signal to the rate limiter and an output signal of the rate limiter.

In accordance with another embodiment of the present invention, a computer program product to control movement of a device may include a computer usable medium having computer usable program code embodied therein. The computer usable medium may include computer usable program code configured to limit a time rate of change of a device control signal. The computer usable medium may also include computer usable program code configured to substantially avoid any phase loss in limiting the time rate of change of the device control signal. The computer usable medium may further include computer usable program code configured to substantially correct for any bias in limiting the time rate of change of the device control signal.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
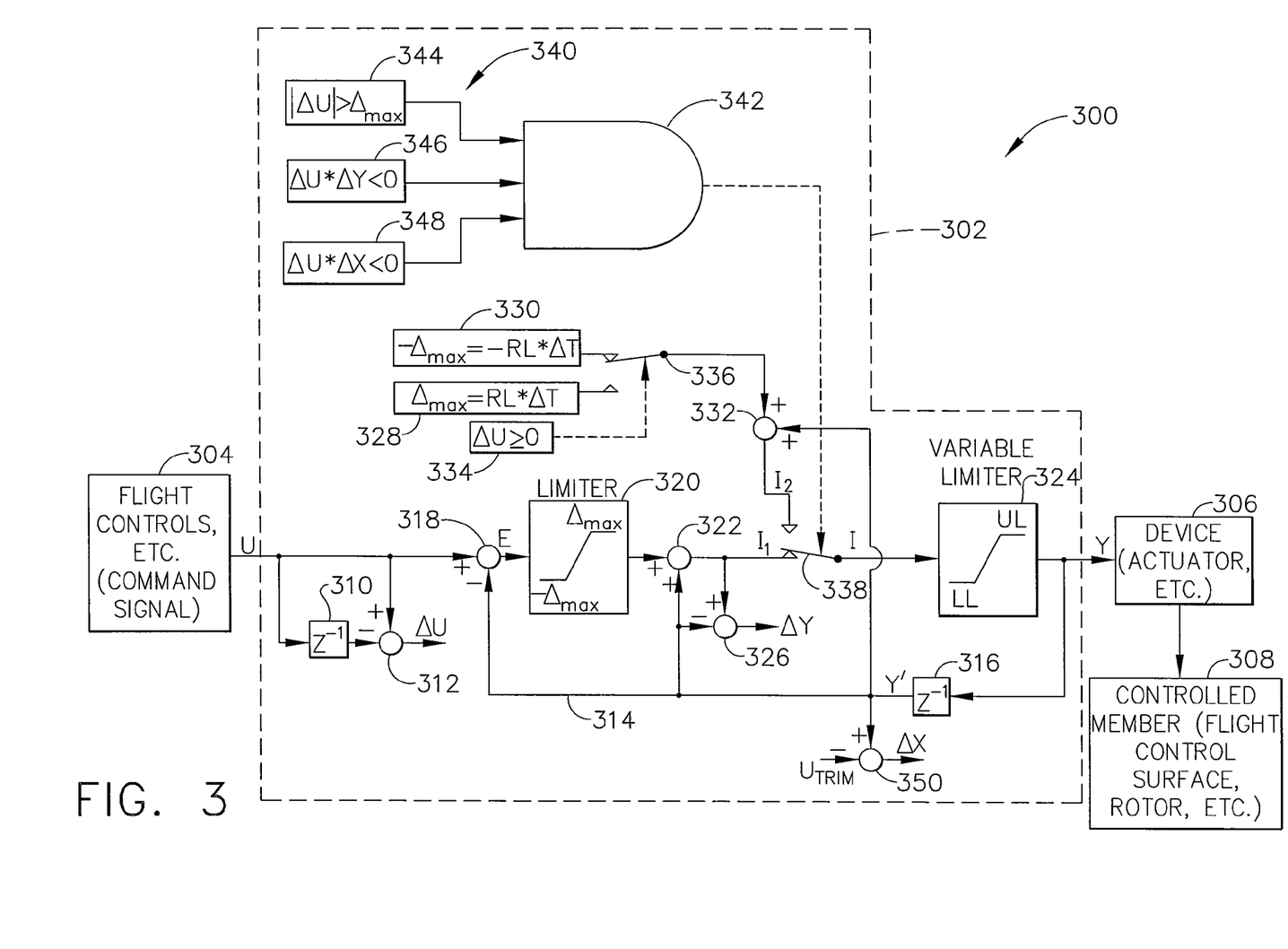
FIG. 3 is a block diagram of an exemplary flight control system including a bias correcting phase compensating rate limiter in accordance with an embodiment of the present invention.

FIG. 3 is a block diagram of an exemplary flight control system 300 including a bias correcting phase compensating rate limiter 302 in accordance with an embodiment of the present invention. The flight control system 300 may include flight controls 304 or other mechanisms for a pilot to control flight of an aircraft. As an example, the flight controls 304 may include rudder pedals, stick, yoke and wheel, collective lever (helicopter), nacelle angle (tilt rotor aircraft) or the like.

The bias correcting phase compensation rate limiter 302 may control the movement of a device 306 to prevent saturation of the device 306 or, in other words, to prevent the rate limitation capabilities of the device 306 from being exceeded by command inputs from the flight controls 304. The device 306 may be an actuator or other mechanism for operating a controlled member 308 of an aircraft. The controlled member 308 may be a flight control surface, rudder, elevator, aileron, rotor or the like.

The flight controls 304 may generate a command signal (U) or input signal to the rate limiter 302. A time rate of change of the command signal ($\Delta U$) may be determined. The time rate of change of the command signal ($\Delta U$) may be determined or calculated by applying the command signal (U) to a transfer function or module 310. The transfer function or module 310 may include a time delay circuit. The output signal of the transfer function 310 or delayed command signal may be subtracted from a current command signal (U) in a summer 312 to provide the time rate of change of the command input signal ($\Delta U$).

The bias correcting phase compensation rate limiter 302 may also include a feedback loop 314 to feedback an output signal (Y) of the rate limiter 302. The feedback loop 314 may include another transfer function 316 or module. The second transfer function 316 may also include a time delay circuit. The output of the second transfer function 316 or time delayed output signal (Y') may be subtracted from the command input signal (U) by a second summer 318 to provide an error signal (E). As will be described in more detail, the polarity of the error signal (E) driving the rate limiter 302 may be effectively reversed in response to a set of predetermined conditions.

The rate limiter 302 may also include a limiter 320 to limit the error signal (E) to a predetermined range ($-\Delta_{max}$ to $\Delta_{max}$). The predetermined range ($-\Delta_{max}$ to $\Delta_{max}$) may correspond to a rate limit capability of the device 306, the movement of which the bias correcting phase compensating rate limiter 302 controls to prevent saturation of the device 306 or to prevent the rate limitation capabilities of the device 306 from being exceeded by the command inputs, as previously discussed. The limiter 320 may be a filter, clipper circuit or similar means to limit the range or magnitude of the signal. The output of the limiter 320 may be added to the fed back output signal (Y') of the rate limiter 302 by a third summer 322 to provide a first possible input ($I_1$) to a variable limiter 324. A difference ($\Delta Y$) between an input signal to the variable limiter 324 and the fed back output signal (Y') of the rate limiter 302 may be determined or calculated by a fourth summer 326. The variable limiter 324 may be a filter, clipper circuit or other means of limiting the signal.

A second possible input $I_2$ or alternate input to the variable limiter 324 may be determined by summing either an upper limit ($\Delta_{max}$), as determined in a module 328, or a lower limit ($-\Delta_{max}$), as determined in a module 330, of the rate limit capability of the device 306 to the fed back output signal (Y') of the rate limiter 302 in a fifth summer 332. Either the upper limit ($\Delta_{max}$) 328 or the lower limit ($-\Delta_{max}$) 330 of the rate limit capability of the device 306 may be selected to be added to the fed back output signal (Y') in response to whether the rate of change of the command signal ($\Delta U$) is greater than or equal to zero (command signal is going positive or the signal has a positive slope) or $\Delta U$ is less than zero (command signal is going negative or has a negative slope) which may be determined in a module 334. A first double pole, single throw (DPST) switch arrangement 336 or the like may be controlled by the rate of change of the command signal ($\Delta U$) from module 334. The lower rate limit ($-\Delta_{max}$) 330 capability of the device 306 may be selected to be connected to the summer 332 in response to $\Delta U$ being greater than or equal to zero from module 334. The upper rate limit ($\Delta_{max}$) 328 capability of the device 306 may be selected to be connected to the summer 332 by the switch 336 in response to $\Delta U$ being less than zero from module 334.

The upper limit ($\Delta_{max}$) may be determined by the rate limit (RL) of the device 306 being multiplied by a sample time ($\Delta T$) in seconds. This determination or calculation may occur in the module 328. Similarly, the lower limit ($-\Delta_{max}$) may be determined or calculated by the negative rate limit ($-RL$) of the device 306 being multiplied by the same time ($\Delta T$) in seconds. The determination of the lower limit ($-\Delta_{max}$) may be determined or calculated in the module 330.

The rate limiter 302 may include a second DPST switch arrangement 338 or the like to select between the input $I_1$ or the alternate input $I_2$ to the variable limiter 324 in response to a set of predetermined conditions 340. In accordance with the present disclosure, selecting either the input $I_1$ or the input $I_2$ as the input to the variable limiter 324 will effectively reverse the polarity of the error signal (E). The second switch arrangement 338 may be controlled by an AND gate 342 which may receive as inputs the set 340 of predetermined conditions. Accordingly, the switch arrangement 338 may be adapted to reverse the polarity of the error signal (E) in response to the set or group of predetermined conditions 340. The set or group of predetermined conditions may include: a commanded rate of movement from the flight controls 304 exceeding a rate limit capability of the device 306 ($|\Delta U|>\Delta_{max}$) which may be determined in module a 344; a time rate of change of an input signal ($\Delta U$) to the rate limiter 302 being opposite in polarity to a difference ($\Delta Y$) between the input signal to the rate limiter 302 and an output signal from the rate limiter ($\Delta U * \Delta Y < 0$) which may be determined in a module 346; and a time rate of change of the input signal ($\Delta U$) to the rate limiter 302 being opposite in polarity to a difference ($\Delta X$) between the output signal (Y') from the rate limiter 302 and a signal corresponding to a pre-specified neutral or trim position ($U_{TRIM}$) of the device ($\Delta U * \Delta X < 0$) which may be determined in a module 348. The difference ($\Delta X$) between the output signal (Y') and the signal corresponding to the pre-specified neutral or trim position ($U_{TRIM}$) may be calculated by a fifth summer 350.

Figure 4:
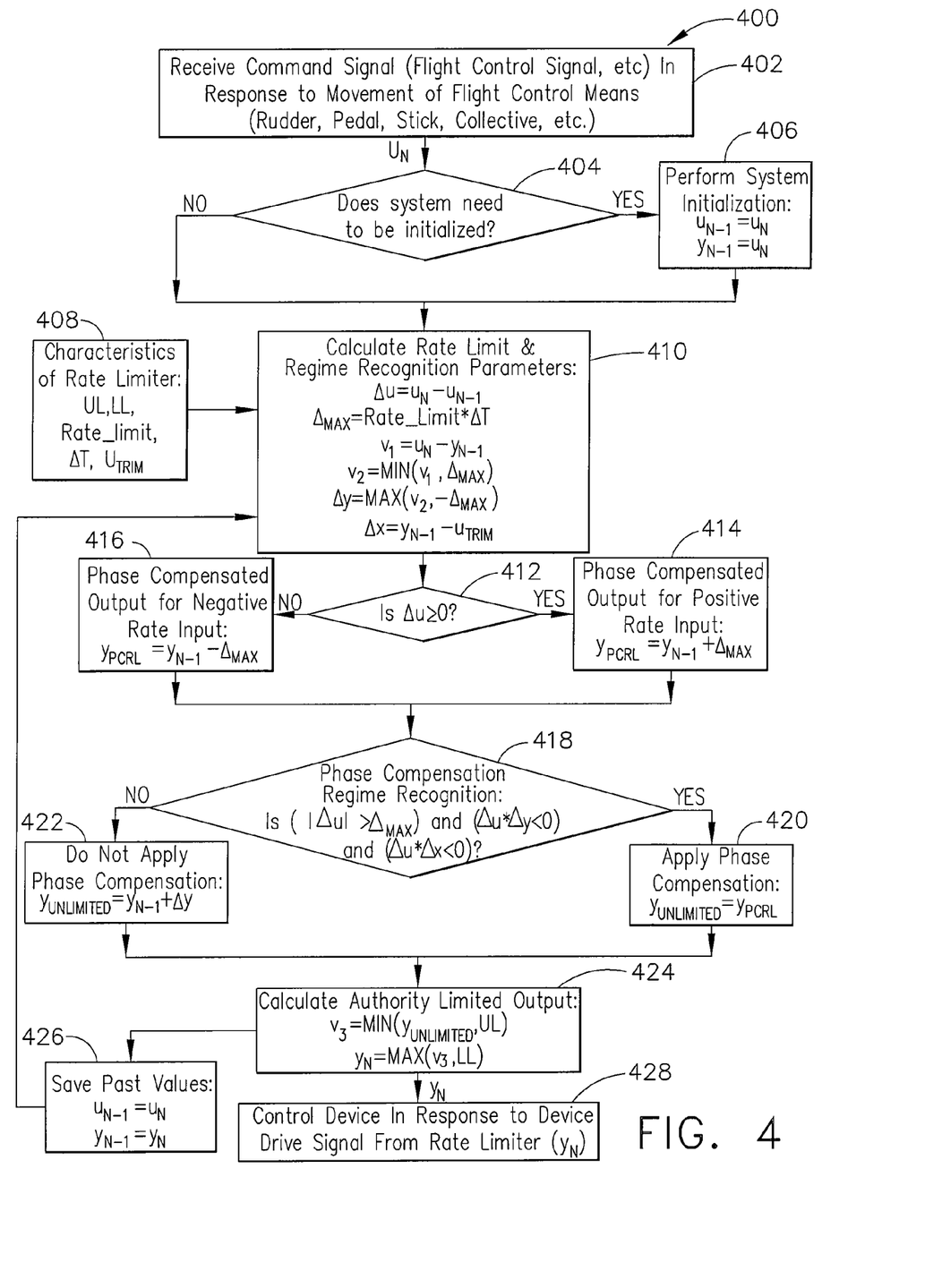
FIG. 4 is a flow chart of an exemplary method to control a device or aircraft in accordance with an embodiment of the present invention.

FIG. 4 is a flow chart of an exemplary method 400 to control a device or aircraft in accordance with an embodiment of the present invention. The method 400 may be embodied in the system 300 of FIG. 3 or may be performed by a processor that may be part of a flight control system or the like. In block 402, a command signal, flight control signal or similar signal may be received by the system, such as system 300 or other flight control system. The command signal may be received in response to operation or movement of a flight control means, such as rudder pedals, stick, collective lever or the like.

In block 404, a decision may be made whether to initialize states in the software. Initialization should be performed during the first pass through the software. If the decision in block 404 is to perform initialization, the method 400 may advance to block 406 In block 406, the previous time frame's values of the control input signal ($u_{N-1}$) and the output signal ($y_{N-1}$) may be initialized to the current value of the control input signal ($u_N$).

In block 408, the characteristics that define operation of the Bias Correcting Phase Compensating Rate Limiter (PCRL) may be entered into the program. The block 408 Bias Correcting PCRL characteristics may include the desired upper authority limit (UL) of the output signal, the desired lower authority limit (LL) of the output signal, the desired rate limit, the update time frame ($\Delta T$) of the software, and the value of a trim or neutral point of the signal being rate limited ($u_{TRIM}$) that provides satisfactory system performance when the command signal is modulated at high rate.

In block 410, parameters for subsequent rate limiting and regime recognition functions may be calculated. The fundamental parameters calculated in block 410 may be the change in control input between the current and last time frames ($\Delta u$), the maximum change in output signal allowed in one time frame ($\Delta_{MAX}$), the error signal between the current input ($u_N$) and last time frame output ($y_{N-1}$) signals limited to a range of values between $+/-\Delta_{MAX}$, and the difference ($\Delta x$) between the value of the signal during the last time frame and the trim or neutral point of the signal being rate limited.

In block 412, a decision may be made to recognize the time rate of change of the control input signal as either positive or negative. If a determination is made that the time rate of change is greater than or equal to zero, the method 400 may advance to block 414. In block 414, if the time rate of change of the control input signal is positive, the phase compensated output signal position ($y_{PCRL}$) may be calculated for a positive rate input. In block 416, if the time rate of change of the control input signal is negative, the phase compensated output signal position ($y_{PCRL}$) is calculated for a negative rate input.

In Block 418, regime recognition or current state or status of the system may be used to decide the most appropriate way to limit the time rate of change of the command signal to prevent saturation of a device, such as an actuator or other mechanism for moving a control member. The control member may be a control surface of an aircraft, rotor or rotor blade of a helicopter or similar aircraft flight control member. In block 420, any bias between an input signal and an output signal of a rate limiter or the like may be substantially corrected and any phase loss or shift between the input and output signals of the rate limiter may also be substantially compensated. Any bias may be substantially corrected and any phase loss or shift may be compensated between the input and output signals of a rate limiter by reversing the polarity of the error signal driving an output of the rate limiter or similar device in a regime wherein it is appropriate to apply phase compensation. A regime wherein it is appropriate to apply phase compensation is recognized based on a set of predetermined conditions. The predetermined conditions may include but are not necessarily limited to (1) a commanded rate of movement by the flight control means exceeding a rate limit capability of the device, actuator or similar means; (2) a time rate of change of the input signal to the rate limiter being opposite in polarity to a difference between the input signal to the rate limiter and the output signal from the rate limiter; and (3) a time rate of change of the input signal to the rate limiter being opposite in polarity to a difference between the output signal of the rate limiter and a pre-specified neutral or trim position of the device or actuator or aircraft control member or surface.

In block 422, which is executed when it is not appropriate to apply phase compensation, the normal polarity and value of the error between the input signal and last time frame's value of the output signal is used to drive the output of the rate limiter or similar device, precluding the possibility of generating undesirable long term biases between the input and output signals.

In block 424, the output signal is limited to a range between the desired upper (UL) and lower (LL) authority limits of the output signal. In block 426, the current time frame values of the input and output signals are stored for use in the next update cycle of the algorithm.

In block 428, the device, actuator or similar mechanism may be controlled in response to a device drive signal from the rate limiter. As previously discussed, the output of the rate limiter may be fed back and combined with the input signal to the rate limiter to provide the error signal. The polarity of the error signal may be reversed in response to the set of predetermined conditions discussed above to substantially correct for any bias and substantially compensate for any phase loss or lag between the input signal and the output signal of the rate limiter or similar device.

Figure 5:
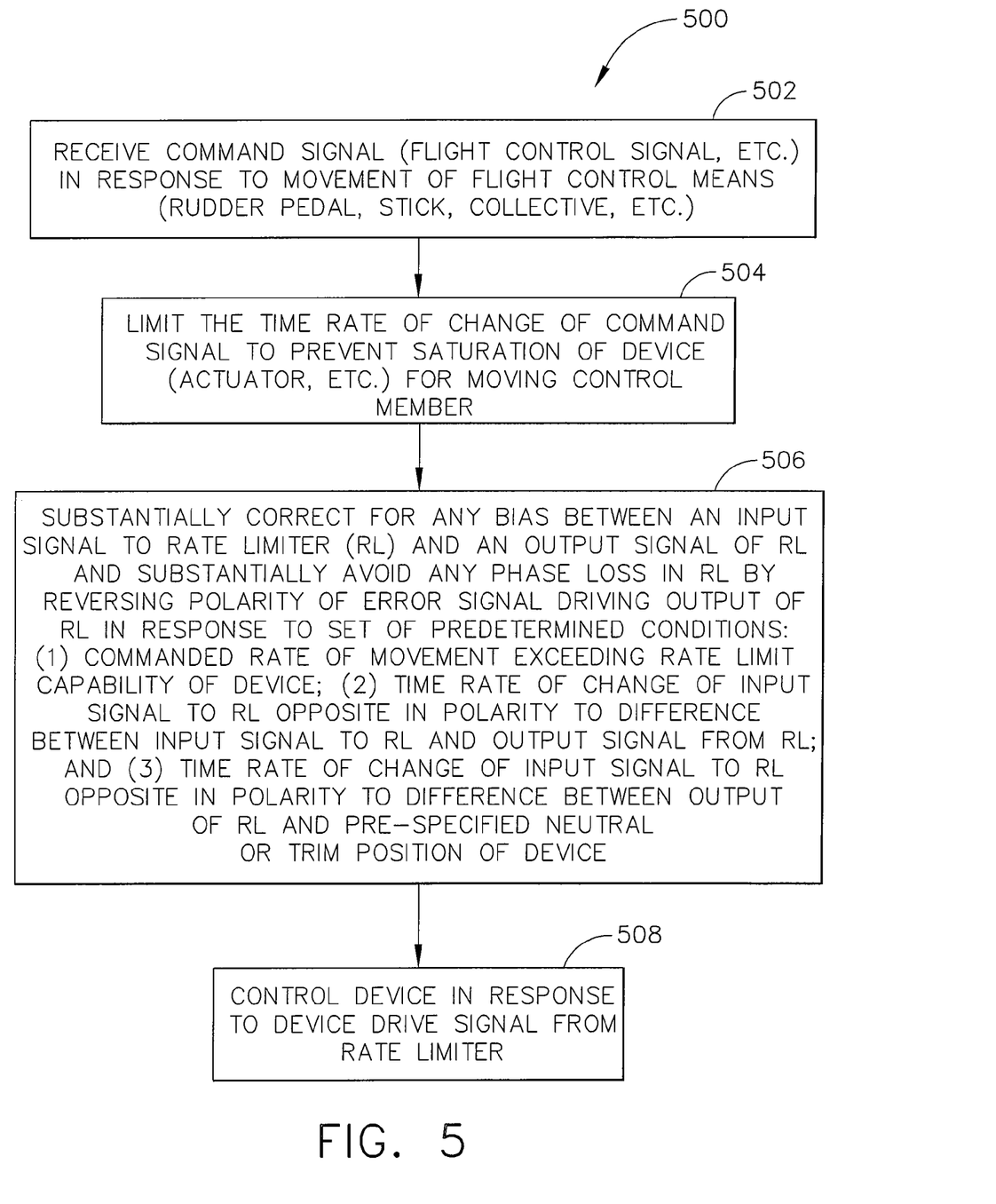
FIG. 5 is a flow chart of an exemplary method to control a device or aircraft in accordance with another embodiment of the present invention.

FIG. 5 is a flow chart of an exemplary method 500 to control a device or aircraft in accordance with another embodiment of the present invention. The method 500 may be embodied in the system 300 of FIG. 3 or may be performed by a processor that may be part of a flight control system or the like. In block 502, a command signal, flight control signal or similar signal may be received by the system, such as system 300 or other flight control system. The command signal may be received in response to operation or movement of a flight control means, such as rudder pedals, stick, collective lever or the like.

In block 504, a time rate of change of the command signal may be limited to prevent saturation of a device, such as an actuator or other mechanism for moving a control member. The control member may be a control surface of an aircraft, rotor or rotor blade of a helicopter or similar aircraft flight control member.

In block 506, any bias between an input signal and an output signal of a rate limiter or the like may be substantially corrected and any phase loss or shift between the input and output signals of the rate limiter may also be substantially compensated. Any bias may be substantially corrected and any phase loss or shift may be compensated between the input and output signals of a rate limiter by reversing a polarity of an error signal driving an output of the rate limiter or similar device. The polarity of the error signal may be reversed in response to a set of predetermined conditions. Similar to that previously discussed, the predetermined conditions may include but are not necessarily limited to (1) a commanded rate of movement by the flight control means exceeding a rate limit capability of the device, actuator or similar means; (2) a time rate of change of the input signal to the rate limiter being opposite in polarity to a difference between the input signal to the rate limiter and the output signal from the rate limiter; and (3) a time rate of change of the input signal to the rate limiter being opposite in polarity to a difference between the output signal of the rate limiter and a pre-specified neutral or trim position of the device or actuator or aircraft control member or surface.

In block 508, the device, actuator or similar mechanism may be controlled in response to a device drive signal from the rate limiter. As previously discussed, the output of the rate limiter may be fed back and combined with the input signal to the rate limiter to provide the error signal. The polarity of the error signal may be reversed in response to the set of predetermined conditions discussed above to substantially correct for any bias and substantially compensate for any phase loss or lag between the input signal and the output signal of the rate limiter or similar device.

Figure 6:
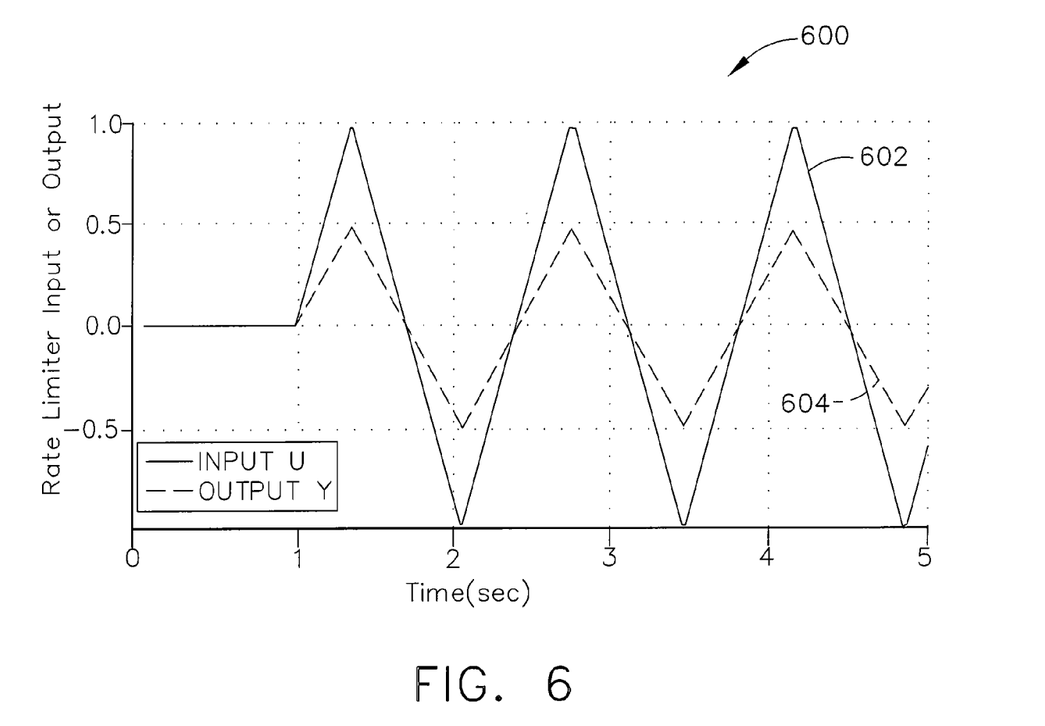
FIG. 6 is a graph of an input signal compared to an output signal of a bias correcting phase compensating rate limiter in accordance with an embodiment of the present invention.

FIG. 6 is a graph 600 of an input signal 602 compared to an output signal 604 of a bias correcting phase compensating rate limiter in accordance with an embodiment of the present invention. As illustrated in FIG. 6 the output signal 604 is substantially corrected for any bias between it and the input signal 602 and also substantially compensated for any phase loss or shift.

One example of an application of the present invention is the CH-47 Chinook helicopter Automatic Flight Control System (AFCS). The Chinook AFCS utilizes a large authority, limited rate electromechanical Differential Air Speed Hold (DASH) actuator in conjunction with a small authority electrohydraulic Integrated Lower Controls Actuator (ILCA) to provide positive longitudinal stick gradient with airspeed, airspeed hold, and pitch attitude and rate stabilization. The Bias Correcting Phase Compensated Rate Limiter invention was developed to control the Chinook's DASH actuator and optimize AFCS performance when the DASH actuator is commanded to move at or beyond its maximum rate capability.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A bias correcting phase compensating rate limiter to control movement of a device, comprising:
a switching arrangement adapted to reverse a polarity of an error signal in response to a set of predetermined conditions comprising:
a commanded rate of movement exceeding a rate limit capability of the device;
a time rate of change of an input signal to the rate limiter being opposite in polarity to a difference between the input signal to the rate limiter and an output signal from the rate limiter; and
a time rate of change of the input signal to the rate limiter being opposite in polarity to a difference between the output signal from the rate limiter and a signal corresponding to a pre-specified neutral or trim position of the device.

2. The rate limiter of claim 1, further comprising a limiter to limit the error signal to a predetermined range.

3. The rate limiter of claim 2, wherein the predetermined range corresponds to the rate limit capability of the device.

4. The rate limiter of claim 1, further comprising a transfer function module to determine a time rate of change of a command input signal.

5. The rate limiter of claim 1, wherein the transfer function module comprises a time delay circuit.

6. The rate limiter of claim 1, further comprising a feedback loop to feedback the output signal of the rate limiter.

7. The rate limiter of claim 1, further comprising:
another switching arrangement to select between an upper limit and a lower limit of the rate limit capability of the device in response to a time rate of change of a command input signal;
a transfer function module to feedback an output signal of the rate limiter; and
a summer to add one of the upper limit and the lower limit of the rate limit capability of the device from the other switching device to the fed back output signal of the rate limiter to provide an alternate input signal to the rate limiter.

8. The rate limiter of claim 1, further comprising an AND gate to control the switching arrangement in response to the set of predetermined conditions.

9. The rate limiter of claim 1, further comprising a variable limiter to further control the output signal from the rate limiter.

10. The rate limiter of claim 1, wherein the device comprises an actuator to control movement of a member for controlling an aircraft.

11. A flight control system, comprising:
a member to control flight of an aircraft;
an actuator to control movement of the member; and
a bias correcting phase compensating rate limiter to control movement of the actuator, wherein the bias correcting phase compensating rate limiter comprises a switching arrangement adapted to reverse a polarity of an error signal in response to a set of predetermined conditions, the set of predetermined conditions comprising:
a commanded rate of movement exceeding a rate limit capability of the actuator;
a time rate of change of an input signal to the rate limiter being opposite in polarity to a difference between the input signal to the rate limiter and an output signal from the rate limiter; and
a time rate of change of the input signal to the rate limiter being opposite in polarity to a difference between the output signal from the rate limiter and a signal corresponding to a pre-specified neutral or trim position of the actuator.

12. The flight control system of claim 11, further comprising a limiter to limit the error signal to a predetermined range.

13. The flight control system of claim 12, wherein the predetermined range corresponds to the rate limit capability of the actuator.

14. The flight control system of claim 11, wherein the rate limiter further comprises:
   another switching arrangement to select between an upper limit and a lower limit of the rate limit capability of the actuator in response to a time rate of change of a command input signal;
   a transfer function module to feedback an output signal of the rate limiter; and
   a summer to add one of the upper limit and the lower limit of the rate limit capability of the actuator from the other switching arrangement to the fed back output signal of the rate limiter to provide an alternate input signal to the rate limiter.

15. The flight control system of claim 11, further comprising a variable limiter to further control the output signal from the rate limiter.

16. A method to control movement of a device, comprising:
   limiting a time rate of change of a device control signal;
   substantially avoiding any phase loss in limiting the time rate of change of the device control signal;
   substantially correcting for any bias in limiting the time rate of change of the device control signal; and
   reversing a polarity of an error signal to substantially avoid any phase loss in limiting the time rate of change of the device control signal and to substantially correct for any bias in limiting the time rate of change of the device control signal, wherein the polarity of the error signal is reversed in response to a set of predetermined conditions, the set of predetermined conditions comprising:
      detecting a commanded rate of movement of the device exceeding a rate limit capability of the device;
      detecting a time rate of change of an input signal to a rate limiter being opposite in polarity to a difference between the input signal to the rate limiter and the output signal from the rate limiter; and
      detecting a time rate of change of the input signal to the rate limiter being opposite in polarity to a difference between the output signal from the rate limiter and a signal corresponding to a pre-specified neutral or trim position of the device.

17. The method of claim 16, further comprising limiting the error signal to a predetermined range corresponding to the rate limit capability of the device.

18. The method of claim 16, further comprising determining a time rate of change of a command input signal.

19. The method of claim 16, further comprising feeding back an output signal of the rate limiter.

20. The method of claim 16, further comprising:
   selecting between an upper limit and a lower limit of the rate limit capability of the device in response to a time rate of change of a command input signal; and
   adding one of the upper limit and the lower limit of the rate limit capability of the device to a fed back output signal of the rate limiter to provide an alternate input signal to the rate limiter.

21. The method of claim 16, further comprising initializing a bias correcting phase compensating rate limiting system in response to receiving a new command signal.

22. The method of claim 16, further comprising determining rate limit and regime recognition parameters.

23. The method of claim 16, further comprising:
   determining a phase compensated output for a negative rate input in response to a negative rate of change of an input command signal; and
   determining a phase compensated output for a positive rate input in response to a positive rate of change of the input command signal.

24. A method to control an aircraft, comprising:
   controlling movement of an actuator;
   limiting a time rate of change of an actuator control signal using a rate limiter;
   substantially avoiding any phase loss in the rate limiter; and
   substantially correcting for any bias between an input signal to the rate limiter and an output signal of the rate limiter
   reversing a polarity of an error signal to substantially avoid any phase loss in the rate limiter and to substantially correct for any bias between the input signal to the rate limiter and the output signal of the rate limiter, wherein the polarity of the error signal is reversed in response to a set of predetermined conditions comprising:
      a commanded rate of movement of the actuator exceeding a rate limit capability of the actuator;
      a time rate of change of an input signal to the rate limiter being opposite in polarity to a difference between the input signal to the rate limiter and the output signal from the rate limiter; and
      a time rate of change of the input signal to the rate limiter being opposite in polarity to a difference between the output signal from the rate limiter and a signal corresponding to a pre-specified neutral or trim position of the actuator.

25. The method of claim 24, further comprising limiting the error signal to a predetermined range corresponding to the rate limit capability of the actuator.

26. The method of claim 24, further comprising generating a command input signal in response to operation of a flight control by a pilot.

27. The method of claim 26, further comprising: selecting between an upper limit and a lower limit of the rate limit capability of the actuator in response to a time rate of change of the command input signal; and adding one of the upper limit and the lower limit of the rate limit capability of the actuator to a fed back output signal of the rate limiter to provide an alternate input signal to the rate limiter.

28. A computer program product to control movement of a device, the computer program product comprising:
   a computer usable medium having computer usable program code embodied therein, the computer usable medium comprising:
   computer usable program code configured to limit a time rate of change of a device control signal;
   computer usable program code configured to substantially avoid any phase loss in limiting the time rate of change of the device control signal;
   computer usable program code configured to substantially correct for any bias in limiting the time rate of change of the device control signal; and
   computer usable program code configured to reverse a polarity of an error signal in response to a set of predetermined conditions to substantially avoid any phase loss in limiting the time rate of change of the device control signal and to substantially correct for any bias in limiting the time rate of change of the device control signal, the set of predetermined conditions including a commanded rate of movement exceeding a rate limit capability of the device; a time rate of change of an input signal to a rate limiter being opposite in polarity to a difference between the input signal to the rate limiter and an output signal from the rate limiter; and a time rate of change of the input signal to the rate limiter being opposite in polarity to a difference between the output signal from the rate limiter and a signal corresponding to a pre-specified neutral or trim position of the device.

29. The computer program product of claim 28, further comprising:
   computer usable program code configured to detect if the commanded rate of movement is in excess of the rate limit capability of the device;
   computer usable program code configured to determine if the time rate of change of the input signal to the rate limiter is opposite in polarity to the difference between the input signal to the rate limiter and the output signal from the rate limiter; and
   computer usable program code configured to determine if the time rate of change of the input signal to the rate limiter is opposite in polarity to the difference between the output signal from the rate limiter and the signal corresponding to the pre-specified neutral or trim position of the device.

30. The computer program product of claim 28, further comprising computer usable program code configured to limit the error signal to a predetermined range corresponding to the rate limit capability of the device.

31. The computer program product of claim 28, further comprising:
   computer usable program code configured to select between an upper limit and a lower limit of the rate limit capability of the device in response to a time rate of change of a command input signal;
   computer usable program code configured to time delay a feedback output signal of the rate limiter; and
   computer usable program code configured to add one of the upper limit and the lower limit of the rate limit capability of the device to the time delayed feedback output signal of the rate limiter to provide an alternate input signal to the rate limiter.

* * * * *

UNITED STATES PATENT AND TRADEMARK OFFICE
CERTIFICATE OF CORRECTION

PATENT NO. : 7,627,403 B2
APPLICATION NO. : 11/277262
DATED : December 1, 2009
INVENTOR(S) : Miller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this

Second Day of November, 2010

David J. Kappos
*Director of the United States Patent and Trademark Office*